United States Patent
Au et al.

(10) Patent No.: US 10,430,017 B2
(45) Date of Patent: Oct. 1, 2019

(54) TARGET POINTING SYSTEM MAKING USE OF VELOCITY DEPENDENT CURSOR

(71) Applicant: City University of Hong Kong, Hong Kong (HK)

(72) Inventors: Kin Chung Au, Hong Kong (HK); Xiaojun Su, Hong Kong (HK); Wing Hung Rynson Lau, Hong Kong (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 462 days.

(21) Appl. No.: 15/100,899

(22) PCT Filed: Dec. 2, 2014

(86) PCT No.: PCT/CN2014/092786
§ 371 (c)(1),
(2) Date: Jun. 1, 2016

(87) PCT Pub. No.: WO2015/081846
PCT Pub. Date: Jun. 11, 2015

(65) Prior Publication Data
US 2016/0299660 A1 Oct. 13, 2016

Related U.S. Application Data

(60) Provisional application No. 61/911,552, filed on Dec. 4, 2013.

(51) Int. Cl.
*G06F 3/0481* (2013.01)
*G06F 3/01* (2006.01)
(Continued)

(52) U.S. Cl.
CPC .......... *G06F 3/04812* (2013.01); *G06F 3/016* (2013.01); *G06F 3/0481* (2013.01);
(Continued)

(58) Field of Classification Search
CPC .. G06F 3/04812; G06F 3/04842; G06F 3/016; G06F 3/0481; G06F 3/017; G06F 3/04892
See application file for complete search history.

(56) References Cited

U.S. PATENT DOCUMENTS 6,075,531 A * 6/2000 DeStefano ............ G06F 3/0481
715/788
2003/0043213 A1* 3/2003 Finley, Jr. ........... G06F 3/04842
715/856
(Continued)

OTHER PUBLICATIONS

Asano, et al., Predictive Interaction using the Delphian Desktop, User Interface Software and Technology Conference, Oct. 23-25, 2005, pp. 133-141.
(Continued)

*Primary Examiner* — Rinna Yi
(74) *Attorney, Agent, or Firm* — Melvin Li; Heslin Rothenberg Farley & Mesiti PC

(57) ABSTRACT

There is disclosed a target pointing system for use in graphical user interface. The system provides a fan-shaped area cursor with a variable spanning angle, a variable range for capturing target items on the user interface and/or a variable orientation. The spanning angle of the area cursor ranges from >0° but <360°. The spanning angle, the range of the area cursor for acquiring target items and/or the orientation of the area cursor is dependent on velocity of movement of the area cursor.

6 Claims, 12 Drawing Sheets

(51) Int. Cl.
  *G06F 3/0484* (2013.01)
  *G06F 3/0489* (2013.01)
  *G06F 3/033* (2013.01)
(52) U.S. Cl.
  CPC .......... *G06F 3/04842* (2013.01); *G06F 3/033* (2013.01); *G06F 3/04892* (2013.01)

(56) References Cited

U.S. PATENT DOCUMENTS

2008/0225007 A1* 9/2008 Nakadaira ........... G06F 3/03545
                                                              345/173
2013/0125067 A1* 5/2013 Moon ................. G06F 3/04812
                                                              715/862

OTHER PUBLICATIONS

Baudisch, et al., Drag-and-Pop and Drag-and-Pick: techniques for accessing remote screen content on touch- and pen-operated systems, Human-Computer Interaction, INTERACT'03, Aug. 2003, pp. 57-64.
Baudisch, et al., Starburst: a Target Expansion Algorithm for Non-Uniform Target Distributions, Advanced Visual Interfaces Conference May 28-30, 2008, pp. 129-137.
Bezerianos, et al., The Vacuum: Facilitating the Manipulation of Distant Objects, CHI Conference, Apr. 2-7, 2005, pp. 361-370.
Blanch, et al., Semantic Pointing: Improving Target Acquisition with Control-Display Ratio Adaptation, CHI Conference, Apr. 29, 2004, vol. 6, No. 1, pp. 519-526.
Blanch, et al., Rake Cursor: Improving Pointing Performance with Concurrent Input Channels, CHI Conference Apr. 4-9, 2009, pp. 1415-1418.
Blanch, et al., Benchmarking Pointing Techniques with Distractors: Adding a Density Factor to Fitts' Pointing Paradigm, CHI Conference May 7-12, 2011, p. 1629-1638.
Chapuis, et al., DynaSpot: Speed-Dependent Area Cursor, CHI Conference Apr. 4-9, 2009, pp. 1391-1400.
Cockburn, et al., Human On-Line Response to Visual and Motor Target Expansion, Graphics Interface, 2006, pp. 81-87.
Cockburn, et al., Improving the Acquisition of Small Targets, Proceedings of HCI 2003, 2004, pp. 181-196.
Grossman, et al., The Bubble Cursor: Enhancing Target Acquisition by Dynamic Resizing of the Cursor's Activation Area, CHI Conference, Apr. 2-7, 2005, pp. 281-290.
Guiard, et al., Object Pointing: A Complement to Bitmap Pointing in GUIs, Canadian Human-Computer Communications Society in the Proceedings of Graphics Interface, May 17-19, 2004, pp. 9, 16.
Gutwin, Carl, Improving Focus Targeting in Interactive Fisheye Views, CHI Conference, Apr. 20-25, 2002, vol. No. 4, Issue No. 1, pp. 267-274.
Hertzum, et al., Input techniques that dynamically change their cursor activation area: A comparison of bubble and cell cursors, ScienceDirect, 2007, pp. 833-851.
Igarashi, et al., Speed-dependent Automatic Zooming for Browsing Large Documents, User Interface Software and Technology Conference, 2000, CHI Letters, vol. 2, 2, pp. 139-148.
Kabbash, et al., The "Prince" Technique: Fitts' Law and Selection Using Area Cursors, CHI Conference, 1995, pp. 273-279.
Kobayashi, et al., Ninja Cursors: Using Multiple Cursors to Assist Target Acquisition on Large Screens, CHI Conference, Apr. 5-10, 2008, pp. 949-958.
Lank, et al., Endpoint Prediction Using Motion Kinematics, CHI Conference Apr. 28-May 3, 2007, Empirical Models, pp. 637-646.
Laukkanen, et al., The Cone and the Lazy Bubble: Two Efficient Alternatives between the Point Cursor and the Bubble Cursor, CHI Conference, Apr. 5-10, 2008, pp. 309-312.
Mackenzie, Fitts' Law as a Research and Design Tool in Human-Computer Interaction, Human-Computer Interaction, 1992, vol. 7, pp. 91-139.
McGuffin, et al., Fitts' Law and Expanding Targets: Experimental Studies and Designs for User Interfaces, ACM Transactions on Computer-Human Interaction, vol. 12, No. 4, Dec. 2005, pp. 388-422.
Moscovich, et al., Multi-finer Cursor Techniques, Graphics Interface 2006, pp. 1-7.
Pietriga, et al., Sigma Lenses: Focus-Context Transitions Combining Space, Time and Translucence, CHI Conference, Apr. 5-10, 2008, Multidimensional Visualization, pp. 1343-1352.
Soukoreff, et al., Towards a standard for pointing device evaluation, perspectives on 27 years of Fitts' law research in HCI, ScienceDirect, International Journal of Human-Computer Studies, 61, 2004, pp. 751-789.
Worden, et al., Making Computers Easier for Older Adults to Use: Area Cursors and Sticky Icons, CHI Conference, Mar. 1997, pp. 266-271.
Yin, et al., The Beam Cursor: A Pen-based Technique for Enhancing Target Acquisition, Proceedings of HCI 2006, Sep. 2007, pp. 119-134.

* cited by examiner

TARGET POINTING SYSTEM MAKING USE OF VELOCITY DEPENDENT CURSOR

CROSS REFERENCE TO RELATRED APPLICATIONS

This application is a national stage filing under section 371 of International Application No. PCT/CN2014/092786, filed on Dec. 2, 2014, and published in English on Jun. 11, 2015, as WO 2015/081846 A1, and claims priority of U.S. provisional application No. 61/911,552, filed on Dec. 4, 2013, the entire disclosure of these applications being hereby incorporated herein by reference in their entirety.

FIELD OF THE INVENTION

The present invention is concerned with a target pointing system for use in graphical user interface, and in particular but not limited to an implicit fan-shaped cursor for use in such system. The present invention is also concerned with a method of operation thereof.

BACKGROUND OF THE INVENTION

In graphical user interfaces (GUIs), target pointing is a fundamental task for acquiring interface elements or components such as buttons, menu items and icons. With the increase in both size and resolution of computer displays, there are increasing number and/or smaller interface elements. The drawback is that it becomes more difficult for a user to acquire such interface elements over a large display screen with the traditional point cursor. The difficulties have worsened when many user interfaces nowadays often involve multiple extended screens. Difficulties in using such system can hinder work productivity and can cause repetitive motion disorders to some users.

Several techniques have been proposed in recent years to address this problem and to improve pointing performance. One of the approaches is to reduce cursor movement by directly altering the cursor or target locations. These techniques perform better than traditional point cursor in a sparse desktop environment. However, they are sensitive to the density and layout of the interface components, and their performance de-grades when the target item to be captured is spatially close to multiple nearby objects. Since it is common to have non-uniform target distributions and clusters of small targets in GUIs, these techniques would not reliably provide a performance improvement over the traditional point cursor.

Other systems have been proposed for dense target environments. They include techniques that are based on expending the size of the targets, dynamic control display ratio and multiple cursors. One technique developed from the area cursor is the Bubble cursor. The Bubble cursor technique dynamically adjusts the cursor's activation area such that only the closest target is captured. This is equivalent to expending the boundary of each target to the Voronoi cell with the target center being the cell center, such that the Voronoi tessellation defined by all targets fills the whole desktop space. This maximizes the effective sizes of all targets.

Another technique based on the area cursor, called Dynaspot cursor, allow the selection of the empty space between targets and reduce rapid changes of cursor size. This technique couples the cursor's activation area with its speed, behaving as a point cursor at low speed and a circular area cursor at high speed. However, this technique limits the maximum size of the circular area, and thus the cursor still needs to travel a long way to access distant targets even in a sparse desktop environment.

The present invention seeks to address the problems associated with conventional cursor techniques, or at least to provide a useful alternative to the public.

SUMMARY OF THE INVENTION

According to a first aspect of the present invention, there is provided a target pointing system for use in graphical user interface, comprising a fan-shaped cursor with a variable spanning angle and range for capturing target items on the user interface, wherein the spanning angle of the cursor ranges >0° to <360°, and wherein the spanning angle and/or range of the cursor for acquiring target items is dependent on speed of movement of the cursor. In preferred embodiments, the spanning angle of the cursor may range from >0° to <360°.

Preferably, the area cursor may define a fan shaped activation area, and orientation of the activation area may be determined by direction of movement of the cursor. The spanning angle may be from substantially 0° to 180°.

In an embodiment, the cursor may be movable in a first speed or in a second speed with the first speed lower than the second speed, and the cursor moving in the first speed may adopt a shape generally resembling a spotlight area cursor with a smaller spanning angle, and the second speed may adopt a shape generally resembling a semi-circle or close to a circle. In a specific embodiment, when moving at the first speed the cursor may be configured to acquire distant target items, and at the second speed the cursor may be configured to move towards and approach distant target items at specified orientation. More specifically, the cursor moving at the first speed may have a longer range for acquiring distant target items when compared with at the second speed, whereby distant target items can be acquired with lesser cursor movement.

In one embodiment, during movement of the cursor spotting distance between the cursor and a target item within range may be dynamically and automatically adjusted such that only one target item is captured.

In some embodiments, fan-shaped configuration of the cursor may or may not be visible by a user for facilitating selection or acquisition of target items.

According to a second aspect of the present invention, there is provided a method for acquiring targets in graphical user interface, comprising steps of:
a) providing a fan-shaped area cursor for acquiring a target item on a graphical user interface, motion of the area cursor is determined by a pointing device held of a user;
b) detecting speed and direction of the motion of pointing device;
c) computing size and shape of an activation area of the area cursor;
d) determining and capturing current selectable target in virtual desktop environment;
e) providing feedback on a selectable target that is being captured to user;
f) providing opportunity for user to select the target having been captured;
g) on instructions from user via the pointing device, selecting the captured target in the graphical user interface; and
h) providing feedback to user confirming the selected target having been acquired.

In an embodiment, in step b) the detecting speed and direction of the motion of pointing device may further comprise steps of:
i) detecting hardware motion events of the pointing device;
ii) computing instant speed and direction of the motion of the pointing device;
iii) generating data of detected motion of the pointing device;
iv) applying smoothing and/or de-noising filters on the detected motion data;
v) computing current smoothed speed of the motion of the pointing device; and
vi) computing current smoothed direction of the motion of the pointing device.

In one embodiment, in step c) the computing size and shape of the activation area of the area cursor may further comprise steps of:
i) computing the spanning angle of the activation area as a function of current smoothed speed of the motion of the pointing device;
ii) computing a direction of the activation area as a function of the current smoothed direction of the motion of the pointing device; and
iii) computing the size and shape of the activation area with respect to the computed spanning angle and direction from step i) and step ii).

In another embodiment, in step d) the determining and capturing current selectable target in virtual desktop environment may further comprise a step of determining the current selectable target as the selectable target overlapping with the activation area, with the minimum distance to the activation area, the smallest overlapping area with the activation area, and/or with the minimum distance to the cursor.

In yet another embodiment, in step h) the feedback is visual, audio or motion feedback, and may further comprise steps of:
i) changing visual properties such as size, color, shape, textual data and/or layer of the captured selectable target;
ii) displaying visual element to indicate the captured selectable target;
iii) playing sound or audio or voice to indicate the captured selectable target; and/or
iv) providing feedbacks such as vibration or tactile feedback to indicate the captured selectable target.

The steps of selecting and acquiring the captured target in virtual desktop environment may further comprise steps of:
i) detecting action on the pointing device performed by user such as mouse clicks, key presses, touch events, voice input; and
ii) associating predefined acquiring and/or selecting event such as left/right clicks, keyboard shortcuts to the captured target.

The steps of providing visual and/or other feedback on a captured target being acquired may further comprise:
i) changing visual properties such as size, color, shape, textual data and/or layer of the acquired selectable target;
ii) displaying visual element to indicate the acquired selectable target;
iii) playing sound, audio or voice to indicate the acquired selectable target;
iv) providing other feedbacks such as vibration and/or tactile feedback to indicate the acquired selectable target; and
v) performing predefined action such as opening a selected file or activating an UI component associated to the acquired selectable target.

BRIEF DESCRIPTION OF DRAWINGS

Some embodiments of the present invention will now be explained, with reference to the accompanied drawings, in which.

DETAILED DESCRIPTION OF PREFERRED EMBODIMENTS OF THE PRESENT INVENTION

Figure 1:
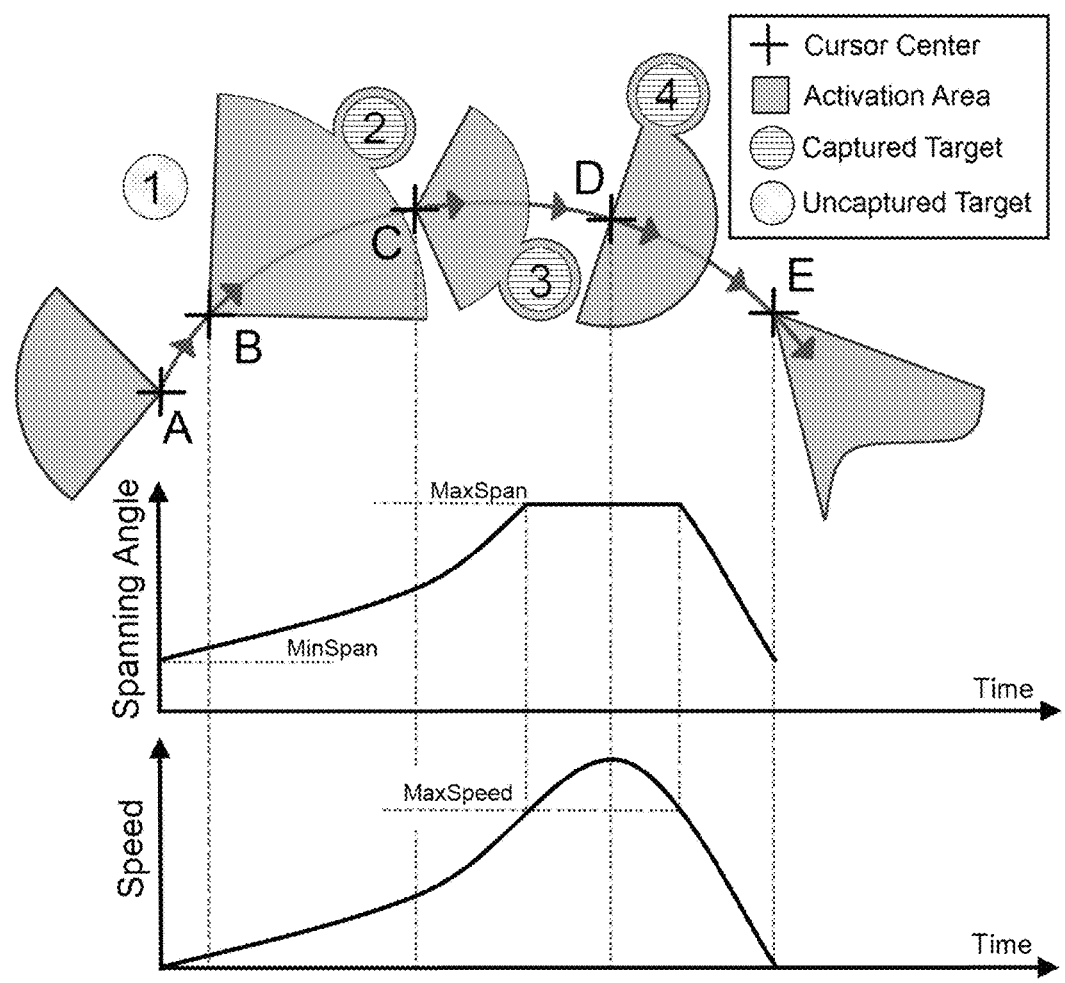
FIG. 1 is a schematic diagram showing variable configuration (e.g. spanning angle) of an implicit fan cursor (IFC) dynamically changing during a course of movement thereof according to the present invention, and the configuration is dependent on the speed and/or orientation of the cursor.

The Fitts' law is typically used to study pointing in graphical user interfaces (GUIs). It is a model for predicting the movement time (MT) in pointing tasks as:

$$MT = a + b \cdot \log_2\left(\frac{A}{W} + 1\right) \qquad (1)$$

where A is the distance (or amplitude) between the cursor and the target in a user interface or a desktop environment; W is the target width; a and b are two empirically determined constants, depending on hardware configuration and user behavior.

Reducing the Movement Amplitude

During research leading to the present invention, different studies were considered and analyses were conducted with a view to reduce the movement amplitude. The following alternative systems and techniques were considered.

Using jumping cursors: In this alternative, the movement amplitude A is sought to be reduced by directly altering the cursor or target locations. The drag-and-pop technique temporarily brings the potential targets closer to the cursor when an object is being dragged. The object pointing technique ignores the empty spaces between the potential targets, and the cursor can jump from one selectable target to another.

Another system makes use of a cursor jumping known as the Delphian desktop. With this system, intention of the user's is estimated based on the movement direction and the peak velocity of the cursor. This estimation allows the cursor to jump over obstructive objects.

However, all these techniques are sensitive to the target layout and density. Their performances are also heavily dependent on the accuracy of the target prediction algorithm used. With an improved endpoint prediction method, the accuracy rate can be improved to 42%. Nevertheless, the behavior of the cursor being able to jump across desktop items can be unpredictable to users, and users may find it annoying and frustrating. This is especially so when wrong predictions are made causing selections of unwanted items.

In an embodiment of the pointing system according to the present invention, travelling distance of the cursor is reduced in sparse desktop. Importantly, instead of jumping among the potential targets, the system provides a smoother cursor movement with a more intuitive orientation control. Details of the system are described in more detail hereinafter.

Using multiple cursors: In this other alternative, multiple cursors for target selection are employed. The Ninja Cursor consists of multiple cursor instances distributed over the screen and concurrently controlled by the same input device. Due the presence of multiple cursors, this essentially reduces the movement distance of any one particular cursor, i.e., between the target and its nearest cursor.

Another multiple-cursor technique, known as the Rake Cursor, captures also the gaze position to help identify the current active cursor.

Whichever multiple cursor system is used, one main drawback is the increase of the total number of visual elements on the screen in a user interface, leading to possible visual distraction and confusion. Further, the need to search for the active cursor introduces further complications and issues of focus switching and may increase the overall interaction time.

Increasing the Target Width

During research leading to the present invention, different studies were considered with a view to increase easiness for selecting a target item by increasing the width of the target. The following alternative systems and techniques were considered.

Increasing the target size: Systems making use of this technique may speed up target pointing by directly increasing the size of the potential targets. A lens-based cursor magnifies nearby objects in the visual space, i.e. screen space, where the information is displayed, but not in the motor space, i.e. device space, where the physical movement takes place. Thus, it still takes a similar amount of movement time for the cursor to reach the target. Other similar techniques involve increasing the target size in both visual and motor spaces when the cursor approaches any potential targets. For example, target expansion is shown to facilitate pointing even if it occurs as late as after 90% of the movement has been completed. Studies have shown that for small targets, visual expansion in unaltered motor-space has similar performance gains as enlarged motor-space.

Using area cursors: Instead of using a single-pixel hotspot as traditional point cursor systems, systems making use of this technique seek to target point by using an area cursor with a larger activation region. This is similar to increasing the effective target size. While the use of an area cursor may make pointing easier, it may capture multiple objects or unwanted objects, leading to ambiguities or errors. This problem may be solved by integrating a point cursor into the area cursor, or by interactively adjusting the cursor area on multi-touch input. For example, the use of a Bubble cursor may improve area cursors by dynamically resizing its activation area depending on the proximity of surrounding targets, such that only one target is captured at any time. This is effectively equivalent to partitioning the empty space into a Voronoi tessellation defined by all targets, thus maximizing the activation area of each target. Systems have been used to make use of a different partitioning method which is better adapted to clustered targets with non-uniform distributions. Several variations of the Bubble cursor have been proposed.

The present invention is based on the use of a dynamic area cursor. However, unlike previous area cursor techniques, the present invention makes use of techniques utilizing both cursor speed and orientation information to control the shape of the cursor's activation area. These techniques allow overlapped (thus larger) effective target widths, and the user can seamlessly switch between the low-speed spot light mode and the high-speed area mode.

The Beam Cursor is a pen-based technique, which exploits the sliding motion and allows selection of the nearby targets in the moving direction of the pen-tip. This is similar to the present invention in the sense that both techniques use the cursor moving direction as input. However, the Beam Cursor also requires the first landing position of the pen-tip to segment the screen into selectable regions. This information is typically not available with a traditional mouse.

The Combined Approach

Approaches with a view to facilitate pointing by dynamically adjusting the control-display ratio and thus changing the underlying movement amplitude as well as target width may be used. However, sticky icons and semantic pointing would slow down the cursor when it approaches a selectable target, thus increasing the underlying target width for easier acquisition. Further, both techniques are sensitive to the layout and density of the targets. While systems using these techniques might work well in a sparse desktop environment to some extent, problems would arise when the targets are clustered. This is because other targets located along the path to the intended target of the cursor movement may slow down the cursor movement.

The Vacuum dynamically controls the positions of the prospective targets. Similar to the present invention, the Vacuum uses a fan shaped area to determine the potential targets. The difference is that the Vacuum attempts to reduce the movement distance by drawing the targets towards the cursor. Animation is applied to smooth the visual state transition. This method significantly reduces the selection time of distant targets, while making no significant improvements when selecting nearby targets.

The Implicit Fan Cursor (IFC) Improved Cursor Configuration

Figure 2:
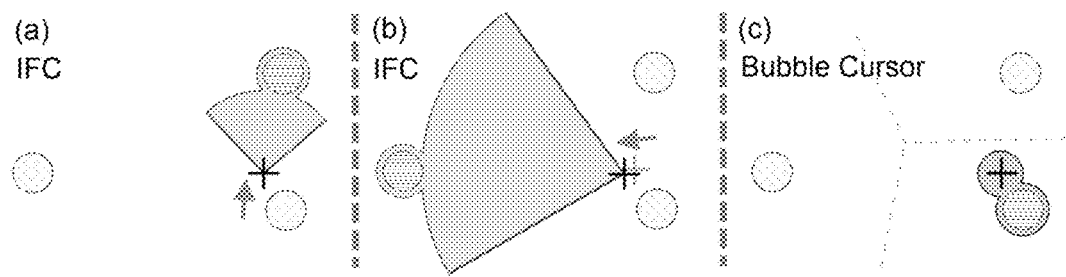
FIGS. 2($a$)-2($c$) are comparative schematic illustrations of different target pointing system behaviours and cursors used therein, in which FIG. 2$a$ is a diagram showing implicit fan cursor's activation area coupled to its velocity of an embodiment of the present invention, FIG. 2$b$ is a diagram showing implicit cursor's activation acquiring a distant target with smaller cursor movement due to its movement of an embodiment of the present invention, and FIG. 2$c$ is diagram showing bubble cursor's capture activation capturing the closest target only without considering the motion of the cursor.

The present invention takes advantage of features of different techniques, and the use of an improved cursor configuration and operation. In some embodiments, the configuration used for the cursor is of a fan-shaped, and the cursor is named as the Implicit Fan Cursor (IFC). The cursor is designed to facilitate efficient target selection with minimum cursor movement, thus improving target selection and acquisition efficacy. The use of this improved cursor dynamically adjusts the spanning angle and orientation of the cursor's activation area to facilitate different selection styles, i.e. behaving as a spotlight to search for targets with precise orientation control or behaving as an area cursor to search for nearby targets with rough orientation control, without requiring any explicit mode switching. The cursor makes use of different speed-dependent techniques including techniques of the area cursor, interactive zooming, and sigma lenses. Compared with conventional area cursor techniques, cursors of pointing system according to the present invention adopt a fan-shape activation area to allow the user to specify its focusing orientation with the cursor's moving direction, and to ensure the nearest target along this moving direction to be captured first, as shown in FIGS. 1 and 2. In order to reduce error rate and to capture only one intended target in any particular time, the radius of the fan of the cursor is automatically set to the distance of the nearest target that the fan cursor reaches.

FIG. 2(a) illustrates a fan-shaped cursor or an Implicit Fan Cursor in accordance with the present invention. The IFC's activation area is coupled to the cursor's velocity. In FIG. 2(b), it is shown that a user can select and reach a distant target with smaller cursor movement. This is to be contrasted with conventional pointing system, such as the Bubble Cursor system as shown in FIG. 2(c). As can be seen, the Bubble cursor system always captures the closest target without considering the cursor's motion.

Conventional area cursor techniques typically capture the nearest target with minimum spatial distance, without considering the dynamic motion information of the cursor, e.g. the Bubble cursor as shown in FIG. 2(c). The IFC of the present invention allows the user to focus on targets along the movement direction and thus to select a target that may not be nearest to the cursor as shown in FIG. 2(a). This means that the effective size of the targets can be larger than the corresponding Voronoi cells defined by all target centers. By utilizing the cursor's motion information, the effective areas of the targets could now be overlapped, allowing the user to pick a non-obscured target with minimum cursor movement and without the need to move the cursor to the Voronoi cell of the desired target, as shown in FIG. 2(b). As a result, individual targets have extended effective widths that are much larger than their corresponding Voronoi cells. The Fitts' law can verify that the IFC can facilitate more effective pointing performance than the other area cursor techniques that give relatively smaller effective widths.

To reduce visual distraction, in use the fan-shape activation area need not be shown or visualized by the user, and that is the reason why the term Fan Cursor of the present invention is called as "implicit". The fan-shape of the activation is merely a conceptual tool that the system uses behind the scene. (However, in other embodiments or applications, e.g. in graphic design applications, the fan-shaped cursor can be shown.) When the fan cursor is not shown, only the captured target is highlighted. Studies have been conducted using three different display styles and these studies have confirmed that not displaying the activation area as shown in FIG. 3(c) would give better results in many applications. Some comparative results are shown in FIGS. 3(a)-(b).

It is thus to be noted that the visual display of the fan fan-shape activation of the cursor in FIGS. 1 to 2. They are in fact invisible to the user in most applications. It is to be noted that it is typically easier for the user to identify the captured target as it is highlighted with an expended contour, which has the same translucent color as the circular cursor shown in FIG. 3(a).

Figure 3:
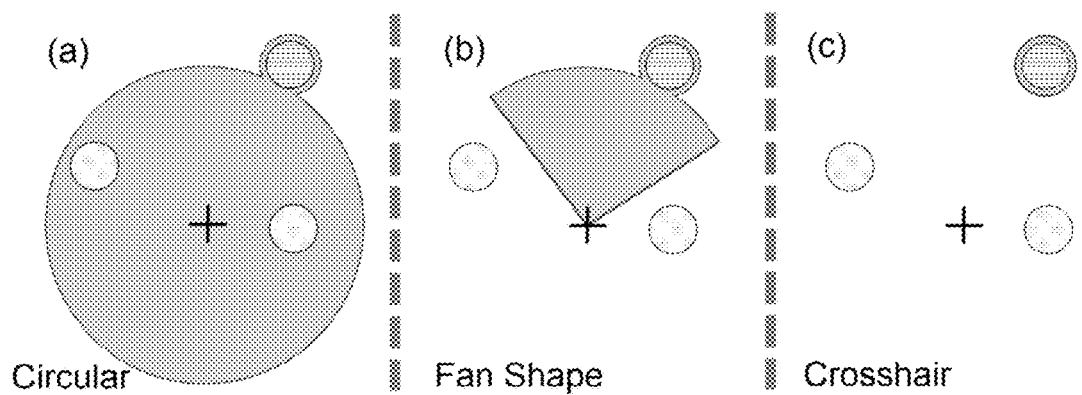
FIG. 3 is a comparative illustration of using three types of cursor shape, namely a) circular shape, b) fan shape and c) crosshair shape.

FIG. 3 illustrates experimentation of using three different display styles: circular-shape, fan-shape and crosshair. For illustrative reason, the captured target is always highlighted in all three display styles.

Velocity-dependent Behavior

As shown in FIG. 1, the spanning angle of the activation area is set dynamically according to the cursor speed, bounded by the predefined minimum and maximum spanning angles (MinSpan, MaxSpan). The IFC facilitates efficient pointing in both coarse and dense target configurations. With a smaller spanning angle at low speed, users can have a more precise orientation control, reaching distant targets with only small cursor movements. For example, in FIG. 1, the cursor at point A only needs to travel a short distance to point B to capture target 2. At high speed, the cursor behaves as a semi-circular area cursor and allows rough but effective target selection. For example, target 4 in FIG. 1 can be captured by moving the cursor from point C to the target location roughly, as the spanning angle is maximized at high speed. User studies were conducted to determine the most suitable minimum and maximum spanning angles, and 3 found that setting MinSpan and MaxSpan to 90 degrees and 180 degrees, respectively, gives the best performance. However, the working range of the spanning angle may range from essentially 0 degree up to 180 degrees.

In the present invention, the spanning angle α of the fan-shape activation area is linearly proportional to the cursor speed s, given that the cursor speed is less than a speed threshold MaxSpeed. When the cursor exceeds MaxSpeed, the fan reaches the maximum spanning angle MaxSpan. When the user stops moving the mouse, the spanning angle will gradually decrease to MinSpan if no targets are captured. Otherwise, the fan will keep its spanning angle unchanged to avoid undesirable de-selection of the captured target. Studies leading to the present invention have identified that setting the MaxSpeed to 1200 pixels/s works satisfactorily in many applications.

Since the captured mouse positions can be noisy, a simple Exponentially Weighted Moving Average (EWMA) operation is applied to smooth out the noisy samples collected. The EWMA operation averages recent velocity values with exponentially decreasing weights for past velocity values. Specifically, the smoothed velocity $\tilde{v}_t$ of the cursor at the current time t is computed as:

$$\tilde{v}_t = (1-\lambda)\tilde{v}_{t-1} + \lambda v_t \qquad (2)$$

where $\lambda \in [0,1]$ is the weight. $\tilde{v}_{t-1}$ is the smoothed velocity value computed in the last time step, while $v_t$ is the cursor's current velocity value.

With the smoothed velocity $v_t$, the current moving speed $s_t$, orientation $o_t$ and the spanning angle $\alpha_t$ of the cursor can be computed as:

$$s_t = |\tilde{v}_t| \quad (3)$$

$$o_t = \tilde{v}_t / |\tilde{v}_t| \quad (4)$$

$$\alpha_t = \min(\text{MinSpan} + \beta s_t, \text{MaxSpan}) \quad (5)$$

where $\beta$ is a scaling factor for the spanning angle:

$$\beta = (\text{MaxSpan} - \text{MinSpan}) / \text{MaxSpeed} \quad (6)$$

Support for Pointing in the Empty Space

Pointing in the empty space is frequently needed in order to invoke many desktop operations such as region selection and deselection. In the present invention, the IFC can naturally support pointing in the empty space without explicit mode switching using an approach similar to DynaSpot. This is achieved by setting the minimum spanning angle to zero and applying a minimum speed threshold such that the fan cursor is activated only when the cursor speed is higher than the given threshold. Hence, the spanning angle of the activation area grows from a point cursor when the user starts moving the mouse, and the user may select or click at the empty space when the cursor is not moving.

EXPERIMENTS

Experiment 1

Spanning Angle

Before comparing the pointing system of the present invention and with other pointing system, a preliminary study was conducted to evaluate how different spanning angles affect the performance of the proposed fan cursor technique.

Apparatus

This experiment was conducted on a PC with a Pentium Dual-Core 3.4 GHz CPU, a 24" display screen of resolution 1920×1080 and an ordinary optical mouse. It was installed with Windows 7 and the default mouse configuration. The test program was written in C#.

Participants 6 participants (4 males and 2 female) of age 24 to 27 were recruited. All participants were experienced computer users and they were right-handed.

Procedure and Design

Figure 4:
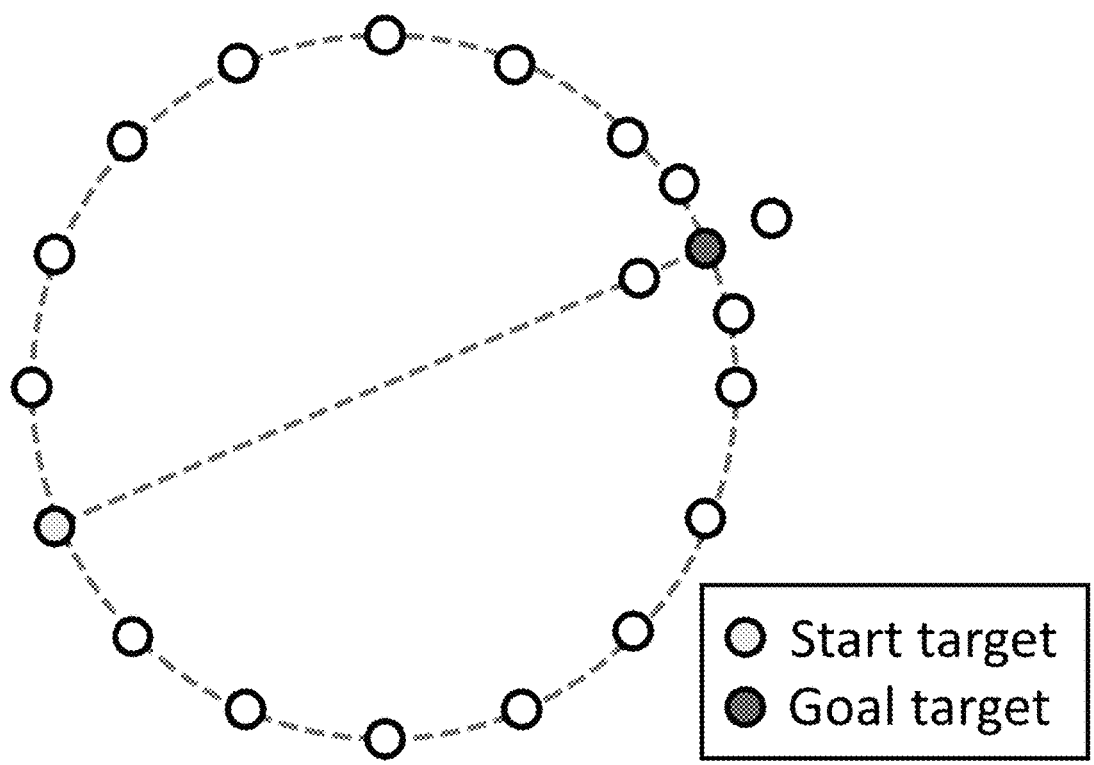
FIG. 4 is a screen layout from an experiment conducted leading to the present invention—the circle in lighter color is a start target while the circle in darker color is an end target, and a participant is asked to first select the start target and then the end target.

Sixteen circular candidate targets of 32 pixels in diameter were evenly distributed on a circle of 300 pixels in diameter centered at the screen center, as shown in FIG. 4. At the start of each pointing task, a pair of opposite start and end targets drawn in lighter color and darker, respectively, were randomly selected from the candidate targets. Participants were asked to first click at the start target and then the end target. When a target was captured, it changed to another color. In order to approximate a more realistic target acquisition scenario, four distracter targets were placed around the end target. Two were placed along the direction of movement with one on each side of the end target, while the other two were placed perpendicular to the direction of movement. The distracters were of the same size as the end target and were 64 pixels away from it. Note that a task would be counted only if the user clicked at the goal target immediately after clicking at the start target. If he mistakenly clicked at a wrong target, e.g., one of the distracters, before clicking at the goal target, this task would be disqualified.

FIG. 4 is the screen layout for preliminary study 1. The circle with lighter color was the start target while the darker circle was the end target. The participant was asked to first select the start target and then the end target.

The experiment was a one-factor within-participant design. Each participant performed the experiment in one session lasting for approximately half of an hour. The session was divided into groups of different spanning angle configurations. The participant was required to perform fifty pointing tasks in each configuration: (MinSpan, MaxSpan)={(30, 30), (30, 90), (30, 180), (90, 90), (90, 180), (90, 270)}, and the configurations were ordered with balanced Latin-square. The movement time of each pointing task, defined as the time duration between the clicking of the start target and that of the end target, and the overall error rate for each configuration were recorded for each participant. Before starting the experiment, each participant was given a single 5-minute warm-up session to get familiar with the interface. A total of 1,500 pointing tasks were performed in this experiment, with each participant performing a total of 300 tasks. It is to be noted that the implicit display style (i.e., crosshair only) was used in this experiment.

Results and Discussion

TABLE 1

Mean movement times and error rates for different spanning angle configurations.

| (MinSpan, MaxSpan) | Mean Movement Time | Error Rate |
|---|---|---|
| (30, 30) | 1052 ms | 9.7% |
| (30, 90) | 992 ms | 13.6% |
| (30, 180) | 907 ms | 14.5% |
| (90, 90) | 904 ms | 9.4% |
| (90, 180) | 851 ms | 9.7% |
| (90, 270) | 862 ms | 10.0% |

The effect of spanning angle configuration was explored by analyzing two dependent variables, movement time and error rate. Repeated measures analysis of variance shows that the use of different spanning angle configurations has a significant effect on the mean movement time and the error rate—Movement time ($F_{(5,25)}=65.32$, $p<0.0001$) and error rate ($F_{(5,25)}=2.31$, $p=0.0593$). Table 1 shows the mean movement time and the error rate of each configuration. The movement time was generally shorter with larger spanning angles in both MinSpan and MaxSpan. This is due to the fact that a smaller spanning angle typically requires a more precise orientation control on the mouse, thus leading to longer manipulation time. However, a fan cursor with spanning angle greater than 180 degrees could capture targets behind the cursor, leading to non-intuitive jumping behavior. This explains that the pointing performance slightly degrades when the maximum spanning angle is higher than 180 degrees. As such, the maximum spanning angle to 180 degrees, which ensures that only targets in front of the cursor will be captured. For the remaining experiments discussed hereinafter, only results from the configuration (90, 180) are shown.

Experiment 2

Display Style

Another preliminary study was conducted to evaluate how different display styles (i.e., how the cursor is visualized)

would affect the performance of the proposed fan cursor technique. In the display styles tested, the underlying (implicit or invisible) activation area of the cursor was always in fan shape, using the same spanning angle configuration of (90, 180); only how the cursor visualized on the screen was changed.

Apparatus and Participants

Same as in Experiment 1.

Procedure and Design

The same pointing task as described in Experiment 1 was used. Each participant was required to perform fifty pointing tasks in each of the three display styles: fan-shape, circular and implicit style. Before starting the experiment, each participant was given a single 5-minute warm-up session to get familiar with the interface. A total of 750 pointing tasks were performed in this experiment, with each participant performing a total of 150 tasks.

Results and Discussion

TABLE 2

Mean movement times and error rates for different display styles.

| Display Style | Mean Movement Time | Error Rate |
| --- | --- | --- |
| Fan-shape | 851 ms | 9.7% |
| Circular | 844 ms | 13.6% |
| Implicit (Crosshair only) | 819 ms | 7.3% |

Table 2 shows the mean movement times and the error rates of different display styles. Some participants commented that both the fan-shape and circular cursors caused visual distraction, due to their continuous changing sizes. They drew user attention, causing unnecessary focus switching between the cursor and the targets. For the fan-shape cursor in particular, the fan-shape activation area distracted them from the selection of the desired target to the manipulation of the cursor orientation. Overall, the implicit cursor performs better. Hence, this display style was used in the main experiment (as described below) for comparing the system used in the present invention and other systems.

Experiment 3 (Main Experiment)

Performance Comparison

After determining the spanning angles and the display style, a main experiment was conducted to quantitatively evaluate the performance of the IFC. Comparison was made with the point cursor which served as a baseline, the Dynaspot (with 32-pixel spot-width) and the Bubble cursor, which are two of the most popular area cursors.

Apparatus

Same as those in preliminary studies 1 and 2.

Participants

Sixteen adult participants (8 males, 8 females) of age 23 to 28 were recruited. All participants are experienced computer users and happened to be right-handed.

Task and Procedure

Figure 5:
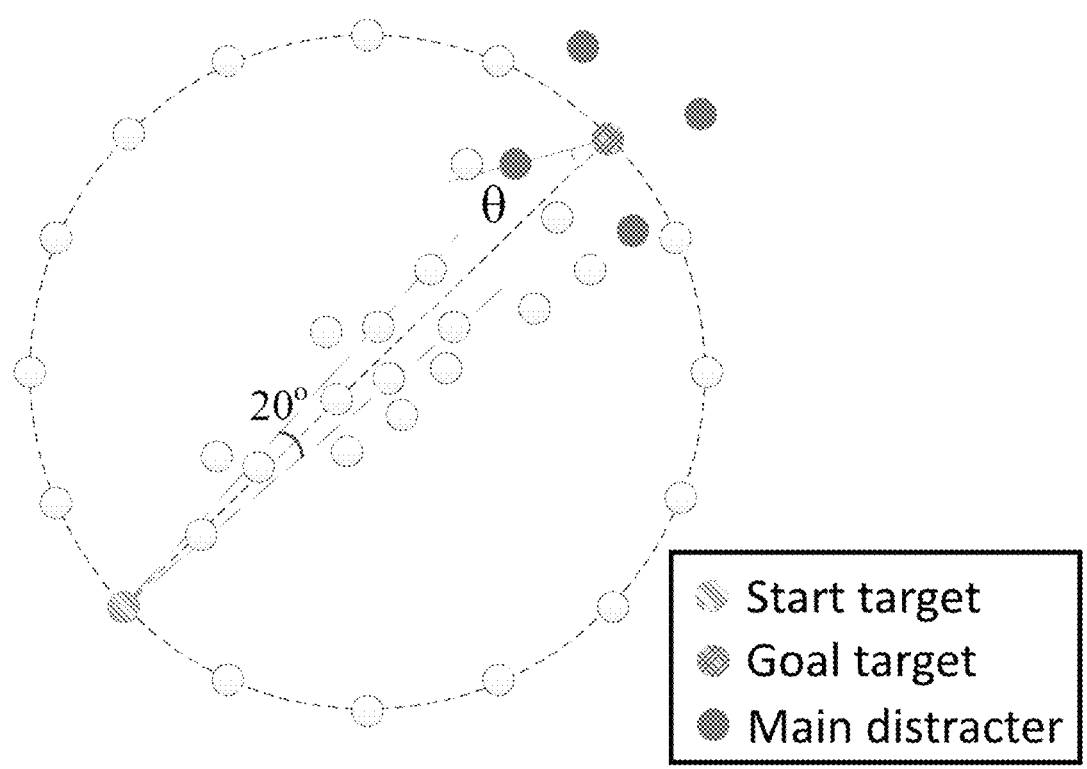
FIG. 5 is a screen layout from another experiment in which the crosshair indicates the current position of the cursor and the circle in darker color is an end target.

The same general procedure as the one used by [9] was followed in testing the Bubble cursor—participants needed to select a goal target drawn in green color, which was surrounded by two groups of distracters, as shown in FIG. 5. As in the preliminary study, when a target is captured by the cursor, it changes to red color. Two groups of distracter targets were created; all of them were set to the same size as the targets and drawn as black outlined circles. One group of four main distracters was placed around the goal target to control the effective width EW of the goal target. A parameter RotaAngle was used to determine the locations of these four main distracter targets. If RotaAngle=0°, two were placed along the direction of movement with one on each side of the target, while the other two were placed perpendicular to the direction of movement, as in the preliminary study. If RotaAngle was not equal to 0°, the four distracter targets were rotated about the goal target in clockwise direction by the corresponding angle. The second group of distracters was placed along the path from the start target to the goal target. They were distributed around a 20° slice originating from the start target to the nearest main distracter so as to match a density condition DD. If DD=1, the slice was packed with distracters such that the distracters did not overlap each other. If DD=0.5, half of the number of distracters as in DD=1 was placed within the slice. If DD=0, zero distracters were placed. After placing the distracters within the slice, similar density of distracters was then placed outside the slice. FIG. 5 shows such an example.

Design

Our experiment was a 4×3×3×3×3×3 within-participant design with the following factors: (1) four techniques TECH for comparison: IFC, Dynaspot, Bubble cursor and Point cursor; (2) three amplitudes A: 256, 512 and 768 pixels; (3) three target widths W: 8, 16 and 32 pixels; (4) three DistracterRatios: 1.5, 3 and 5 (the ratio of the distance between each main distracter and the goal target to the target width); (5) three rotation angles RotaAngle: 0°, 22.5° and 45°; (6) three distracter densities DD: 0, 0.5 and 1.

It is noted that some of the factors (i.e., DistracterRatio, RotaAngle, and DD) are related to the overall target density, and a general density factor could have been used in the experiment instead. However, as the target effective width for different pointing techniques may be defined differently based on W, DistracterRatio and RotaAngle, how these different factors affect the performance of each pointing technique are directly examined here.

Each participant performed the experiment in a single session, which was divided into groups of different pointing techniques. Each TECH group was further divided into 3 subgroups, one for each amplitude A. Each subgroup A was divided into 3 blocks, one for each target width W. In each block, participants completed a total of 27 combinations of DistracterRatio, RotaAngle and DD, presented in random order. Each participant needed to perform 5 pointing tasks for each possible combination of all the factors. A total of 77,760 pointing tasks were thus included in the analysis. Before using each technique, participants were given a single 5-minute warm-up session to get familiar with the technique and the tasks. They were also given a 10-minute break after each TECH group. On average, each participant took approximately 3 hours to complete the whole experiment.

TABLE 3

The ANOVA results for the movement time of TECH × A × W × DistracterRatio × RotaAngle × DD. (DF is the degree of freedom, while DFDen is its denominator.)

| Factors | DF | DFDen | F | p |
| --- | --- | --- | --- | --- |
| TECH | 3 | 45 | 116.4 | <0.0001 |
| W | 2 | 30 | 394.9 | <0.0001 |
| A | 2 | 30 | 236.3 | <0.0001 |
| DistracterRatio | 2 | 30 | 132.3 | <0.0001 |
| TECH × W | 6 | 90 | 9.7 | <0.0001 |

TABLE 3-continued

The ANOVA results for the movement time of
TECH × A × W × DistracterRatio × RotaAngle × DD. (DF is
the degree of freedom, while DFDen is its denominator.)

| Factors | DF | DFDen | F | p |
|---|---|---|---|---|
| TECH × A | 6 | 90 | 3.6 | <0.005 |
| TECH × DistracterRatio | 6 | 90 | 13.2 | <0.0001 |
| TECH × RotaAngle | 6 | 90 | 3.7 | <0.005 |
| TECH × A × DistracterRatio | 12 | 180 | 5.2 | <0.0001 |
| TECH × RotaAngle × DistracterRatio | 12 | 180 | 4.6 | <0.0001 |

TABLE 4

Significant differences for mean movement time
MT between TECH, by Width W, where a < b means
TECH b is significantly faster than TECH a.

| W | Comparison |
|---|---|
| 8 | P < I, D, B |
| 16 | P < I, D, B |
| 32 | P < I, B |

I = IFC,
D = Dynaspot,
B = Bubble,
P = Point

Results and Discussion

Movement Time and Covered Distance

Table 3 shows results of the repeated measures analysis of variance on movement time. It can be seen that TECH, A, W and DistracterRatio have significant effects on the movement time. The average mean movement time was 1,148 ms for IFC, 1,209 ms for Dynaspot, 1,212 ms for Bubble and 1,392 ms for the point cursor. The IFC was the fastest among all four techniques. The following significant interactions are also observed: TECH×A, TECH×W, TECH×DistracterRatio and TECH×RotaAngle. This shows that different techniques were affected differently by the factors.

A Tukey HSD post-hoc test was performed on the differences in mean movement time among the four techniques. Results show that IFC, Dynaspot and Bubble are significantly faster than the point cursor and there are no significant differences in movement time among IFC, Dynaspot and Bubble.

Figure 6A:
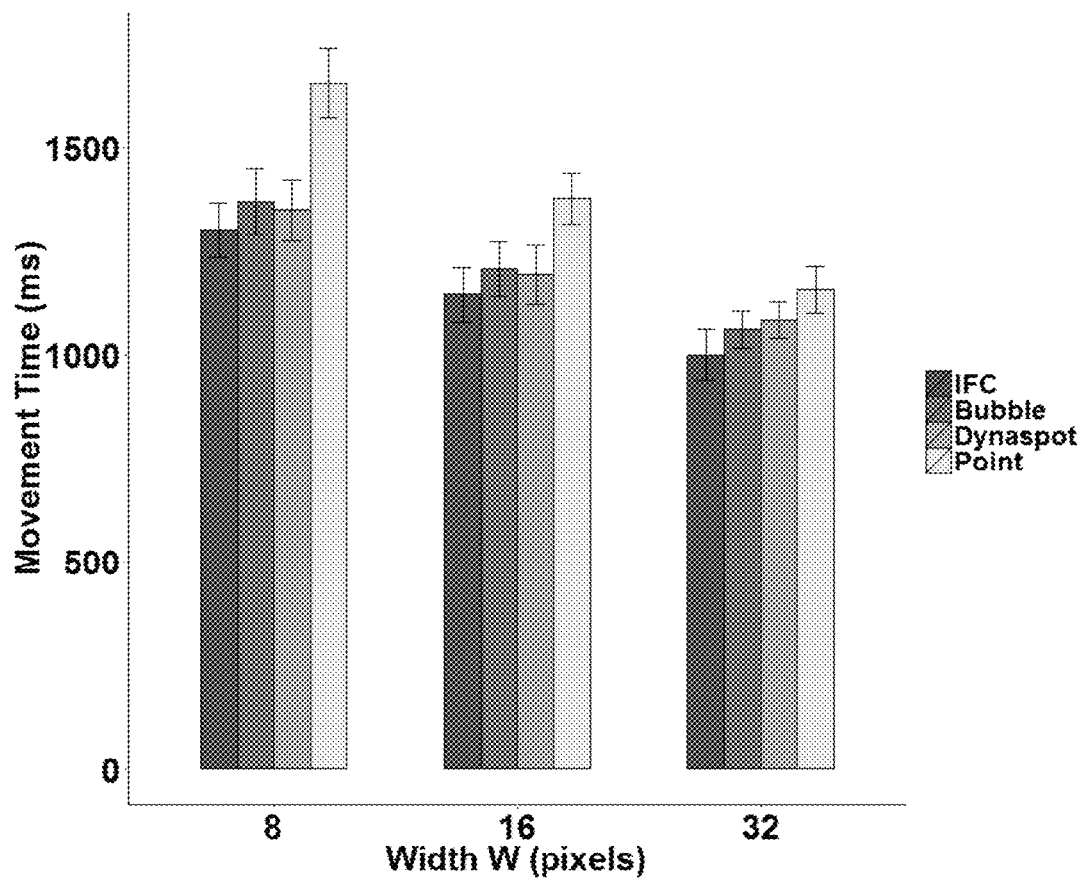
FIG. 6 is a series of charts (i.e. top, middle and bottom) showing movement time or time required to acquire a target (or an end target) in different interface conditions by using conventional systems and system according to the present invention.
Figure 6B:
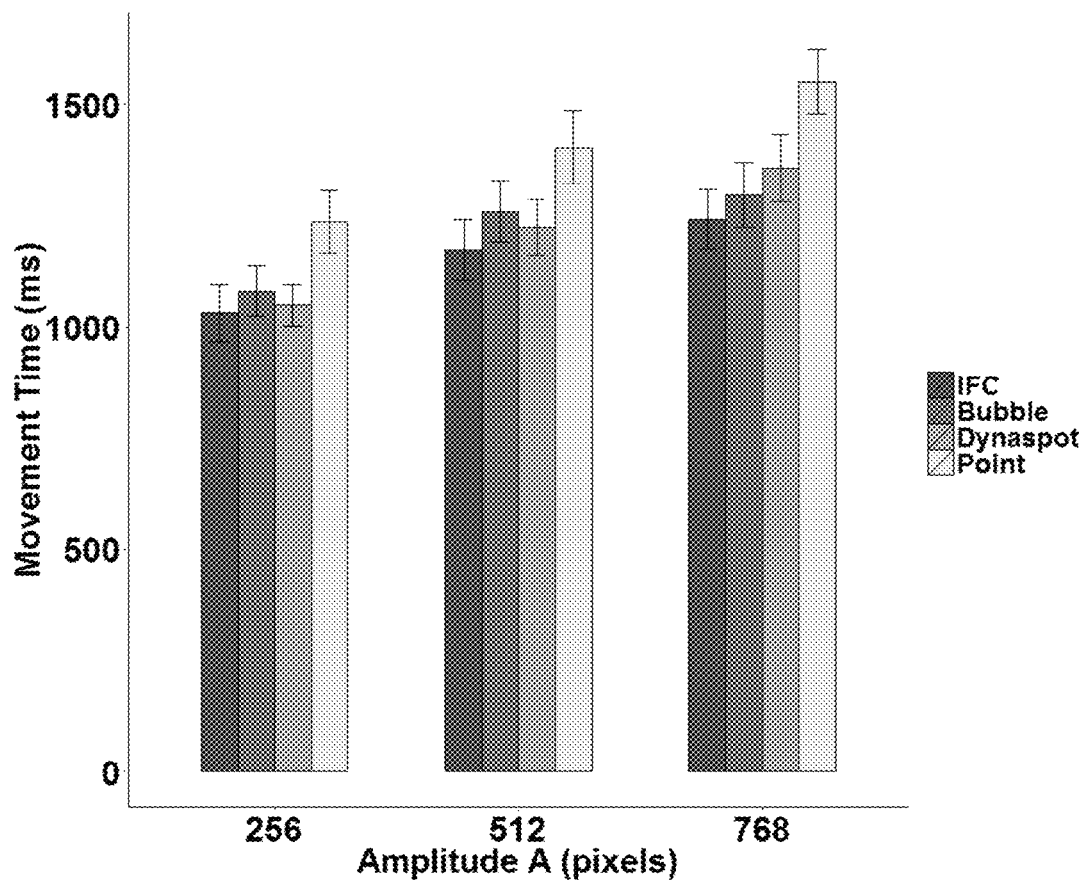
Figure 6C:
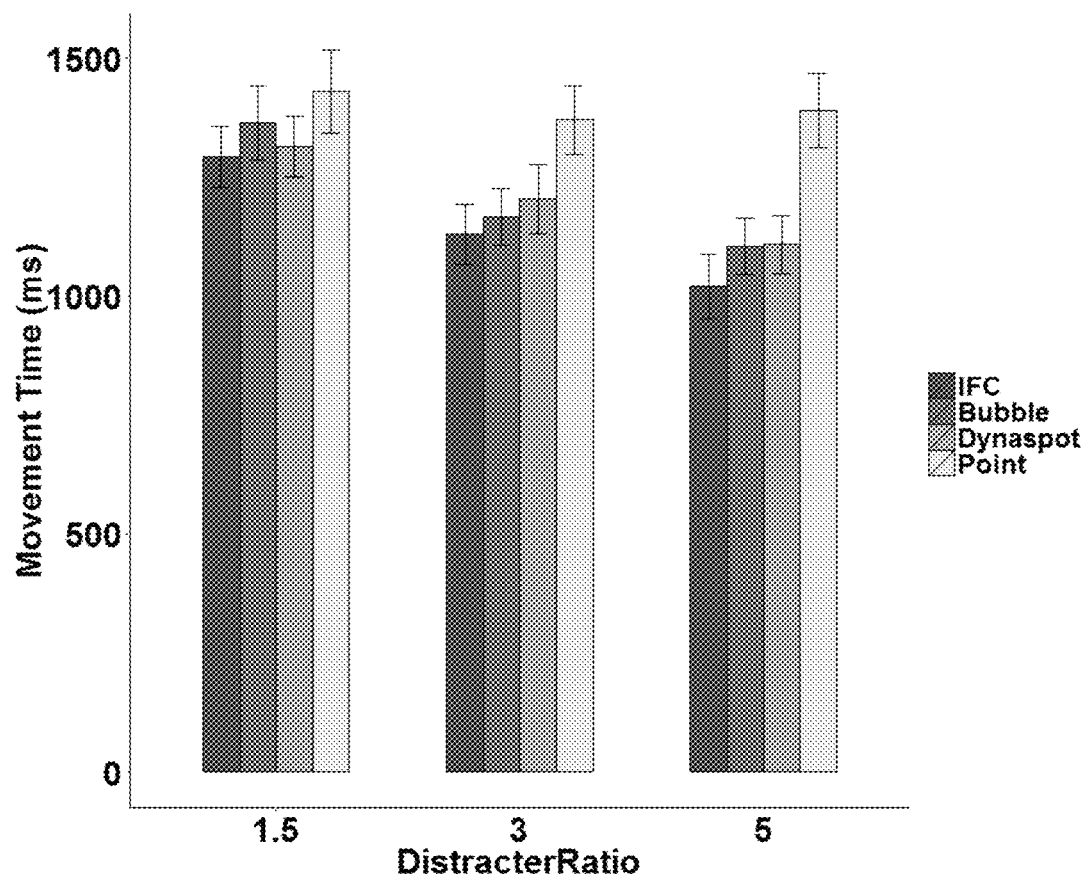

FIG. 6 left shows the movement times of different techniques grouped by different target widths W. A Tukey HSD post-hoc test on the differences among the techniques TECH by width W (Table 4) shows that the movement time decreases significantly as the width increases for all four techniques. In addition, there are no significant differences in movement time among IFC, Dynaspot and Bubble for all W values, and the three techniques are significantly faster than the point cursor at most W values. However, when W=32, there is no significant difference between Dynaspot and the point cursor. This may be due to the fact that the ratio of effective width EW to target width W is relatively small for Dynaspot when the target width is large, and thus the advantage of Dynaspot over the Point cursor becomes less obvious. Here, we have a hypothesis that the effective width EW of the four techniques determines their performance ordering, i.e., a technique with a larger effective width EW should perform better than the other techniques under the same amplitude A and width W.

TABLE 5

Significant differences for mean movement time
MT among TECH by Amplitude A, where a < b means that
TECH b is significantly faster than TECH a.

| A | Comparison |
|---|---|
| 256 | P < I, B, D |
| 512 | P < I, B, D |
| 768 | P < I, B, D; D < I |

I = IFC,
D = Dynaspot,
B = Bubble,
P = Point

TABLE 6

Significant differences for mean movement time
MT among TECH by Distracter Ratio, where a < b means that
TECH b is significantly faster than TECH a.

| DistracterRatio | Comparison |
|---|---|
| 1.5 | P < I, B, D |
| 3 | P < I, B, D |
| 5 | P < I, B, D; B, D < I |

I = IFC,
D = Dynaspot,
B = Bubble,
P = Point

TABLE 7

Significant differences for mean movement time
MT between TECH, by RotaAngle, where a < b means
TECH b is significantly faster thanTECH a.

| RotaAngle | Comparison |
|---|---|
| 0 | P < I, B, D |
| 22.5 | P < I, B, D |
| 45 | P < I, B, D; B, D < I |

I = IFC,
D = Dynaspot,
B = Bubble,
P = Point

TABLE 8

Significant differences for mean movement time MT mong TECH by
DistracterRatio and RotaAngle, where a < b means that
TECH b is significantly faster than TECH a.

| DistracterRatio; RotaAngle | Comparison |
|---|---|
| 1.5; 0 | — |
| 1.5; 22.5 | — |
| 1.5; 45 | — |
| 3; 0 | P < I, B, D |
| 3; 22.5 | P < I, B, D |
| 3; 45 | P < I, B, D; D < I |
| 5; 0 | P < I, B, D; B, D < I |
| 5; 22.5 | P < I, B, D |
| 5; 45 | P < I, B, D; B, D < I |

I = IFC,
D = Dynaspot,
B = Bubble,
P = Point

FIG. 6 middle shows the movement times of different techniques grouped by different movement amplitudes A. A Tukey HSD post-hoc test on the differences among the techniques TECH by amplitude A (Table 5) shows that the movement time increases significantly as the amplitude increases for all four techniques. In addition, there are no significant differences among IFC, Dynaspot and Bubble for A=256 or A=512. The test reveals that IFC is significantly faster than Dynaspot when A=768. The reason may be that Dynaspot has a fixed maximum activation area and thus a fixed potential effective width EW (maximum activation area+W) for each W. For large amplitude, Dynaspot still has to move near to the goal target to capture it. This also indicates that the EW of each technique determines the performance ordering among the techniques.

FIG. 6 right shows the movement times of different techniques grouped by different distracter ratios. A post-hoc test (Table 6) reveals that IFC, Dynaspot and Bubble are significantly faster than the point cursor for all distracter ratios, and that IFC is significantly faster than Dynaspot and Bubble for DistracterRatio=5. This may be due to the fact that Dynaspot and Bubble have fixed potential EW values, although Bubble has a larger one than Dynaspot. However, the IFC can provide a larger EW than Bubble as a result of coupling movement-fan orientation.

Figure 7:
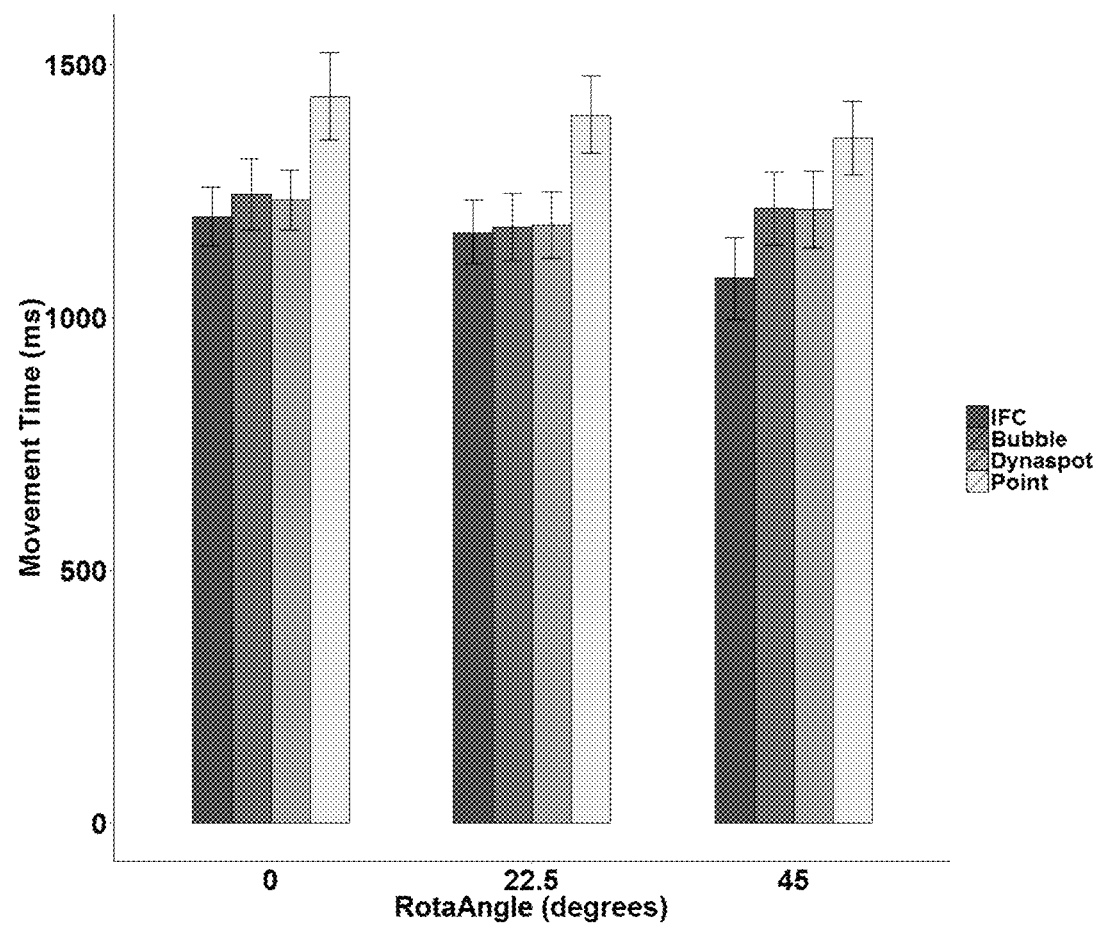
FIG. 7 is a comparison chart showing average movement time or time required to acquire a target (or an end target) under different RotaAngle conditions by using conventional systems and system according to the present invention.

FIG. 7 shows the movement times of different techniques grouped by different RotaAngle values. The post-hoc test reveals that IFC, Dynaspot and Bubble are significantly faster than the point cursor for all RotaAngle values, and that there is no significant different among IFC, Dynaspot and Bubble (Table 7). To further explore the performance differences among the techniques by different factors, we have performed a post-hoc test of the techniques by both distracter ratios and RotaAngle values (Table 8). The test shows that for distracter ratio=5 and RotaAngle=45, IFC performs significantly faster than both Bubble and Dynaspot. Because in this situation, IFC can provide significantly larger EW than Bubble and Dynaspot and thus performs significantly better. We also found that, for distracter ratio=3 and RotaAngle=45, there was not any significant difference among IFC, Bubble and Point. A possible explanation is that IFC and Bubble are likely to first capture either one of the two main distracter targets, which are located between the start target and the goal target. However, the potential effective width of Dynaspot is independent of the cursor location.

Figure 8:
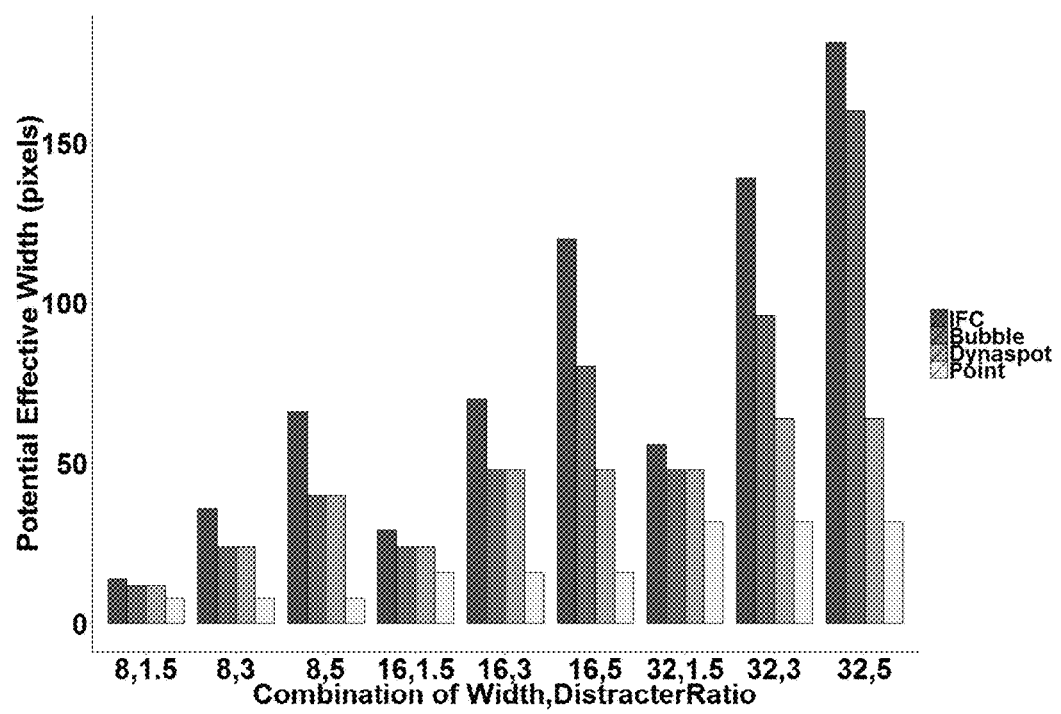
FIG. 8 is a comparison chart showing average potential effective width of targets under combination of different conditions by using conventional systems and system according to the present invention.
Figure 9:
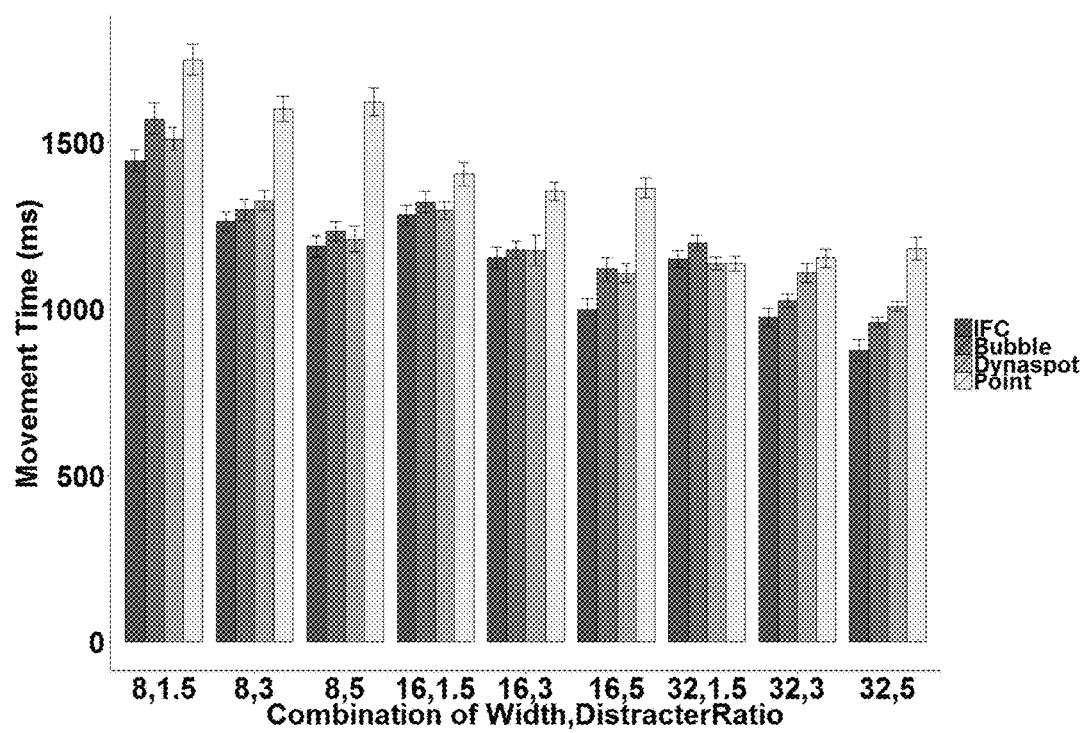
FIG. 9 is a comparison chart showing average movement time or time required to acquire a target under combination of different conditions by using conventional systems and system according to the present invention.

FIG. 8 shows the mean potential effective width EW of different techniques grouped by the combinations of W values and distracter ratio. For the point cursor, the potential EW is the same as the target width. For Bubble, the potential EW is determined by the multiplication of target width and distracter ratio. For Dynaspot, the maximum potential effective width is constrained by the target width and the size of the activation area. Unlike Bubble and Dynaspot, the potential EW of IFC is determined by both the distracter ratio and the cursor velocity (speed and orientation), and is always larger than that of Bubble, which was previously considered as the maximum effective width. The EW of IFC in each selection task is approximated as the distance between the cursor and target at the time the participant clicked and selected the target correctly. Note that this approximation always gives smaller values than the priori potential EW defined by the targets configuration when IFC is using. It can be seen that for all W values and distracter ratios, the posteriori effective widths of IFC are still larger than the (priori) potential EW of all other techniques, and IFC always has the smallest movement time, as shown in FIG. 9.

Figure 10:
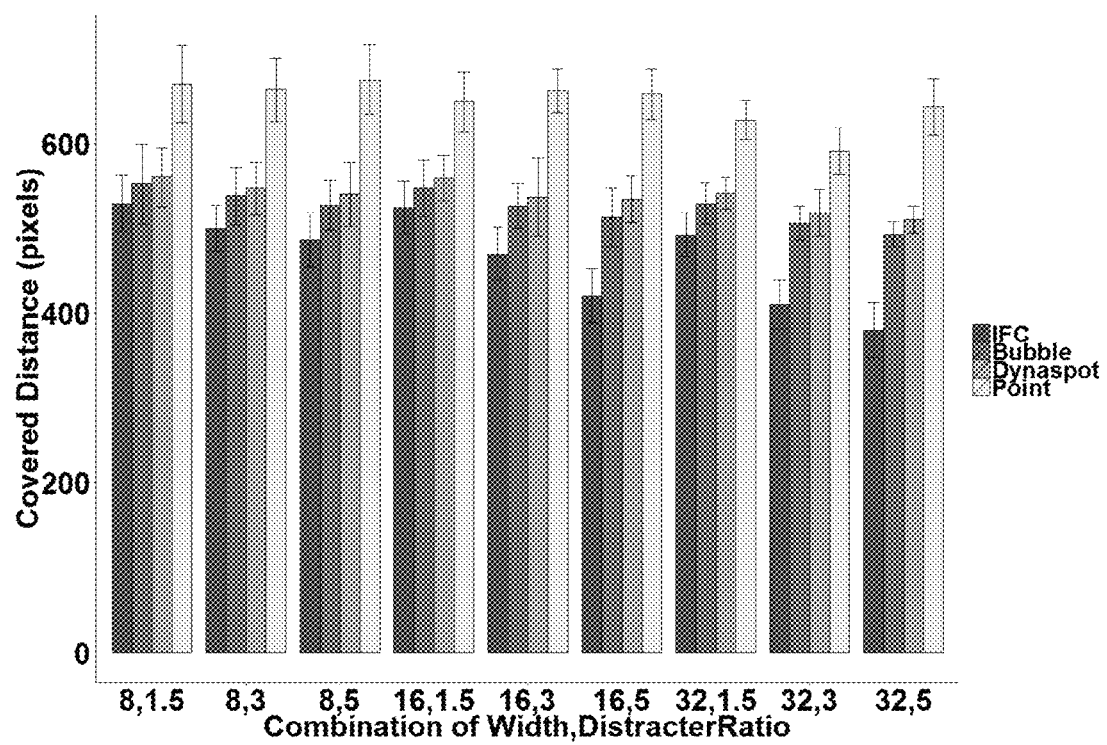
FIG. 10 is a comparison chart showing average covered distance (the physical distance travelled by the cursor) required to acquire a target under combination of different conditions by using conventional systems and system according to the present invention.

The covered distance has also been computed, and is defined as the physical distance travelled by the cursor to acquire the goal target, of the four techniques. The overall mean covered distance was 467 pixels for IFC, 525 pixels for Bubble, 538 pixels for Dynaspot and 648 pixels for the point cursor. FIG. 10 shows the mean covered distances of different techniques grouped by the combination of W values and distracter ratios. It can be seen that for all of W values and distracter ratios, IFC has the smallest covered distance.

Error Rate

Table 9 shows results of the repeated measures analysis of variance on error rate. There is a significant effect for TECH and W on the error rate. The following interactions are also detected: TECH×A, TECH×W and TECH×A×DistracterRatio. A Tukey HSD post-hoc test was performed and no significant differences among IFC, Bubble and Dynaspot were detected. However, IFC was the most accurate among all four techniques. The overall mean error rate was 5.6% for IFC, 805% for Dynaspot, 6.7% for Bubble and 9.3% for the point cursor.

TABLE 9

The ANOVA results for the error rates of
TECH × A × W × DistracterRatio × RotaAngle × DD. (DF is the
degree of freedom, while DFDen is its denominator.)

| Factors | DF | DFDen | F | p |
|---|---|---|---|---|
| TECH | 3 | 45 | 6.82 | <0.001 |
| W | 2 | 30 | 7.63 | <0.001 |
| TECH × A | 6 | 90 | 3.83 | <0.001 |
| TECH × W | 6 | 90 | 2.96 | <0.05 |
| TECH × A × DistracterRatio | 12 | 180 | 2.550 | <0.005 |

Qualitative Results

Participants were asked to rank the techniques by subjective preference in a post-hoc questionnaire. Thirteen participants ranked the IFC as their preferred technique, while three ranked Bubble as their preferred technique and IFC as second. Most participants complained about the visual distraction caused by the Bubble cursor as the cursor becomes extremely large in a sparse environment.

The Fitts' Law and the Index of Difficulty

Figure 11:
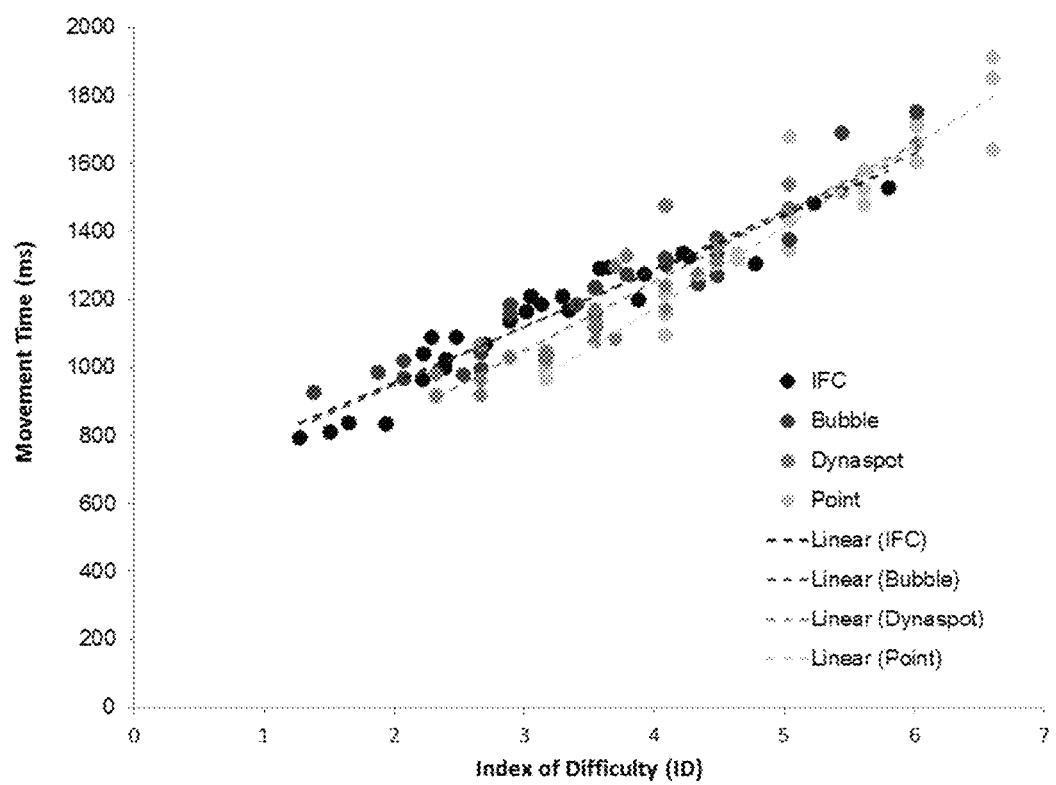
FIG. 11 is a graph plotting the movement times of four techniques as a function of the index of difficulty (ID).

FIG. 11 plots the movement times of the four techniques as a function of the index of difficulty (ID). For IFC, Bubble and Dynaspot, we define the ID using the effective target width as $$\log_2\left(\frac{A}{EW} + 1\right).$$

For Point, we define the ID using the target width as $$\log_2\left(\frac{A}{W} + 1\right).$$

The mean for each amplitude, width and DistracterRatio was taken, fitting 27 points to each technique as shown in FIG. 11. Table 10 lists the intercept, slope and $r^2$ values for each technique. It can be seen that all the techniques fit the linear model with reasonable $r^2$ value. From FIG. 11, it can be concluded that the performance of the IFC can be modeled using the Fitts' law.

TABLE 10

Linear fit: intercept, slope and $r^2$ values for different techniques.

| | $MT = a + b \cdot ID$ | | |
|---|---|---|---|
| Technique | a | b | $r^2$ |
| IFC | 629 | 164 | 0.92 |
| Bubble | 609 | 170 | 0.89 |
| Dynaspot | 441 | 203 | 0.88 |
| Point | 222 | 239 | 0.90 |

As can be appreciated, the present invention provides a new target acquisition system using technique that is based on a velocity-dependent dynamic area cursor. One characteristic is the utilization of the orientation and speed information of the cursor movement to dynamically update the cursor's activation area. This allows the effective width of the selectable targets to be larger than their corresponding Voronoi cells, which was previously considered as the maximum effective width in other area cursor techniques.

The implicit property of the fan cursor of the present invention reduces unnecessary visual distraction and allows users to focus on the target being captured. During a typical target pointing operation, the user's focus may be jumping among the selectable targets. The present invention provides a technique that allows better control over the prediction-based jumping cursor techniques because the acquisition of targets is controlled by the underlying smooth cursor movement. The IFC couples the cursor's activation area with its velocity, i.e., the speed and direction of the mouse motion, behaving like a 2D spotlight cursor at low speed and a circular area cursor at high speed. Thus, it enables the user to precisely acquire distant targets at low speed and easily acquire nearest targets at high speed, without explicit mode switching. This technique minimizes cursor movement, while taking into consideration the precision of cursor movement at different speeds. It also ensures that only one target is captured at any time. The results of our controlled experiments show that the IFC outperforms the point cursor and the area cursor techniques, particularly in term of cursor moving distance, and that its performance can be accurately modeled using the Fitts' law.

The results of controlled experiments as described above show that the IFC is a promising pointing technique with performance advantages over existing area cursor techniques, in terms of both covered distance and movement time. In addition, the performance of our technique can be accurately modeled using the Fitts' law.

As it is apparent, one main purpose of the invention is to improve target selection performance with the proposed velocity dependent area cursor, such that computer users can perform target selection, which is one of the most fundamental and repeatedly performed task, with faster completion time and shorter hand and mouse movement, thus improving overall computer operation efficiency. The invention is applicable in almost all kinds of software environment which involve any UI element selection (such as buttons, icons and menu items). Particularly it is suitable for computer games as object selection and manipulation is the central operations from simple 2D puzzle games to complex 3D MMORPG. Improving target selection performance means improving speed and accuracy of virtual object manipulation, which is important in real-time games as faster player response is always welcome.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

The following references are incorporated in this description in their entirety.

1. Asano, T., Sharlin, E., Kitamura, Y., Takashima, K., and Kishino, F. Predictive interaction using the delphian desktop. In Proc. ACM UIST (2005), 133-141.
2. Baudisch, P., Cutrell, E., Robbins, D., Czerwinski, M., Tandler, P., Bederson, B., and Zierlinger, A. Drag-and-pop and drag-and-pick: Techniques for 8 accessing remote screen content on touch-and pen-operated systems. In Proc. INTERACT (2003), 57-64.
3. Baudisch, P., Zotov, A., Cutrell, E., and Hinckley, K. Starburst: a target expansion algorithm for non-uniform target distributions. In Proc. AVI (2008), 129-137.
4. Bezerianos, A., and Balakrishnan, R. The vacuum: facilitating the manipulation of distant objects. In Proc. ACM CHI (2005), 361-370.
5. Blanch, R., Guiard, Y., and Beaudouin-Lafon, M. Semantic pointing: improving target acquisition with control-display ratio adaptation. In Proc. ACM CHI (2004), 519-526.
6. Blanch, R., and Ortega, M. Rake cursor: improving pointing performance with concurrent input channels. In Proc. ACM CHI (2009), 1415-1418.
7. Blanch, R., and Ortega, M. Benchmarking pointing techniques with distractors: Adding a density factor to fitts' pointing paradigm. In Proc. ACM CHI (2011), 1629-1638.
8. Chapuis, O., Labrune, J.-B., and Pietriga, E. Dynaspot: speed-dependent area cursor. In Proc. ACM CHI (2009), 1391-1400.
9. Cockburn, A., and Brock, P. Human on-line response to visual and motor target expansion. In Proc. GI (2006), 81-87.
10. Cockburn, A., and Firth, A. Improving the acquisition of small targets. In Proc. People and Computers XVII: BCS Conf. on Human Computer Interaction (2003), 181-196.
11. Grossman, T., and Balakrishnan, R. The bubble cursor: enhancing target acquisition by dynamic resizing of the cursor's activation area. In Proc. ACM CHI (2005), 281-290.
12. Guiard, Y., Blanch, R., and Beaudouin-Lafon, M. Object pointing: a complement to bitmap pointing in guis. In Proc. GI (2004), 9-16.
13. Gutwin, C. Improving focus targeting in interactive fisheye views. In Proc. ACM CHI (2002), 267-274.
14. Hertzum, M., and Hornbaek, K. Input techniques that dynamically change their cursor activation area: A comparison of bubble and cell cursors. International Journal of Human-Computer Studies 65,10 (2007), 833-851.
15. Igarashi, T., and Hinckley, K. Speed-dependent automatic zooming for browsing large documents. In Proc. ACM UIST (2000), 139-148.
16. Kabbash, P., and Buxton, W. The "prince" technique: Fitts' law and selection using area cursors. In Proc. CHI (1995), 273-279.
17. Kobayashi, M., and Igarashi, T. Ninja cursors: using multiple cursors to assist target acquisition on large screens. In Proc. ACM CHI (2008), 949-958.

18. Lank, E., Cheng, Y.-C. N., and Ruiz, J. Endpoint prediction using motion kinematics. In Proc. ACM CHI (2007), 637-646.
19. Laukkanen, J., Isokoski, P., and Raiha, K.-J. The cone and the lazy bubble: two efficient alternatives between the point cursor and the bubble cursor. In Proc. CHI (2008), 309-312.
20. MacKenzie, I. Fitts' law as a research and design tool in human-computer interaction. Human Computer Interaction 7,1 (1992), 91-139.
21. McGuffin, M., and Balakrishnan, R. Fitts' law and expanding targets: Experimental studies and designs for user interfaces. ACM Trans. on Computer Human Interaction 12, 4 (December 2005), 388-422.
22. Moscovich, T., and Hughes, J. Multi-finger cursortechniques. In Proc. GI (2006), 1-7.
23. Pietriga, E., and Appert, C. Sigma lenses: focus-context transitions combining space, time and translucence. In Proc. CHI (2008), 1343-1352.
24. Soukoreff, R., and MacKenzie, I. Towards a standard for pointing device evaluation, perspectives on 27 years of fitts' law research in hci. International Journal of Human-Computer Studies 61,6 (December 2004), 751-789.
25. Worden, A., Walker, N., Bharat, K., and Hudson, S. Making computers easier for older adults to use: area cursors and sticky icons. In Proc. ACM CHI (1997), 266-271.
26. Yin, J., and Ren, X. The beam cursor: A pen-based technique for enhancing target acquisition. In Proc. HCI (2006), 119-134.

The invention claimed is:

1. A system for selecting target items in graphical user interface with a target pointing device, the system comprising:
   a display screen for displaying the graphical user interface presenting a plurality of items;
   the target pointing device comprising a pointer defining a fan-shaped activation area with an orientation of the fan-shaped activation area, wherein the fan-shaped activation area of the pointer comprises a variable spanning angle with a variable range of the spanning angle and a variable orientation, wherein the variable range of the spanning angle of the fan-shaped activation area ranges from >0° but <360 for acquiring target items on the user interface displayed on the display screen,
   wherein a shape and a size of the fan-shaped activation area are dependent on speed of movement of the pointer controlled by a user, and the orientation of the fan-shaped activation area is dependent on direction of the movement of the pointer controlled by the user,
   wherein the fan-shaped activation area of the pointer is movable in a first speed or in a second speed with the first speed lower than the second speed on the user interface, and wherein the fan-shaped activation area of the pointer moving in the first speed adopts the shape of the fan-shaped activation area resembling a spotlight fan-shaped activation area with a smaller spanning angle, and the second speed adopts the shape of the fan-shaped activation area resembling a semi-circular shaped activation area or a circular shaped activation with a larger spanning angle to rapidly change the shape and the size of the fan-shaped activation area for efficiently selecting the target items displayed in the graphical user interface.

2. A system as claimed in claim 1 wherein the variable range of the spanning angle is adjustable from substantially 0 degree to 180 degree.

3. A system as claimed in claim 1, wherein at the first speed lower than the second speed, the pointer is configured to acquire distant target items with a smaller pointer movement by the user, and at the second speed higher than the first speed, the pointer is configured to move towards and approach distant target items with a larger pointer movement by the user at specified orientation of the fan-shaped activation area.

4. A system as claimed in claim 1, wherein during movement of the pointer controlled by the user, spotting distance between the pointer and a target item within the range of the spanning angle of the fan-shaped activation area is dynamically and automatically adjustable for capturing only one target item.

5. A system as claimed in claim 1, wherein the fan-shaped activation area of the pointer is visible set by the user.

6. A system as claimed in claim 1, wherein the fan-shaped activation area of the pointer is invisible set by the user.

* * * * *